(12) United States Patent
Gibson et al.

(10) Patent No.: US 8,964,283 B2
(45) Date of Patent: Feb. 24, 2015

(54) REFLECTIVE DISPLAY

(75) Inventors: Gary Gibson, Palo Alto, CA (US); Xia Sheng, Palo Alto, CA (US); Richard H. Henze, San Carlos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/007,612

(22) PCT Filed: Apr. 25, 2011

(86) PCT No.: PCT/US2011/033742
§ 371 (c)(1),
(2), (4) Date: Sep. 25, 2013

(87) PCT Pub. No.: WO2012/148375
PCT Pub. Date: Nov. 1, 2012

(65) Prior Publication Data
US 2014/0049809 A1 Feb. 20, 2014

(51) Int. Cl.
*G02B 26/00* (2006.01)
*G02F 1/167* (2006.01)
*G02F 1/1347* (2006.01)

(52) U.S. Cl.
CPC .............. *G02F 1/167* (2013.01); *G02F 1/1347* (2013.01); *G02F 2001/1672* (2013.01); *G02F 2001/1676* (2013.01)

USPC .......................................................... 359/296

(58) Field of Classification Search
USPC ........................................ 359/296; 345/107
See application file for complete search history.

(56) References Cited

U.S. PATENT DOCUMENTS

| 8,130,441 | B2* | 3/2012 | Frazier et al. ............... 359/296 |
| 8,810,894 | B2* | 8/2014 | Hong et al. .................. 359/296 |
| 2003/0043450 | A1 | 3/2003 | Liang et al. |
| 2006/0216610 | A1 | 9/2006 | Galvin et al. |
| 2010/0134872 | A1 | 6/2010 | Johnson et al. |

FOREIGN PATENT DOCUMENTS

KR   10-2008-0013102 A   2/2008

* cited by examiner

*Primary Examiner* — Tuyen Tra
(74) *Attorney, Agent, or Firm* — Hewlett-Packard Patent Department

(57) ABSTRACT

A display element comprises a cell containing a fluid including a plurality of wells at the bottom of the cell. A luminescent material is within the cell for modulating light incident from the top of the cell and for returning luminescent light; and a dispersion of particles is contained within the fluid. The dispersion of particles is movable between a first state in which the particles are substantially contained within the plurality of wells and a second state in which the particles are distributed between the top and bottom of the cell, to control the intensity of luminescent light returned by the display element.

20 Claims, 6 Drawing Sheets

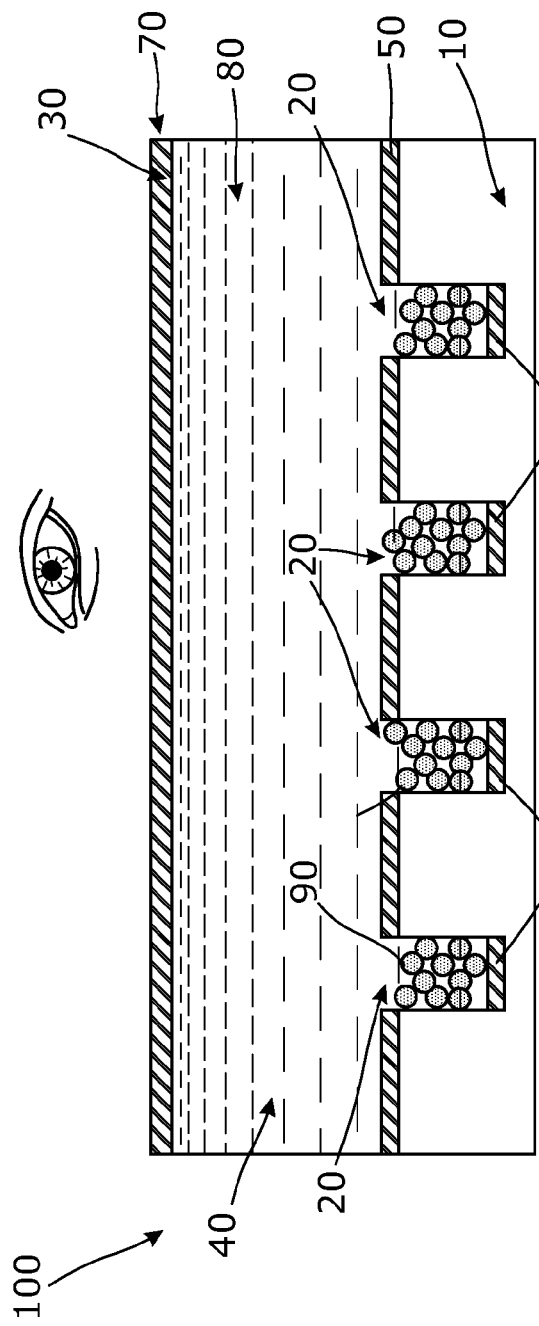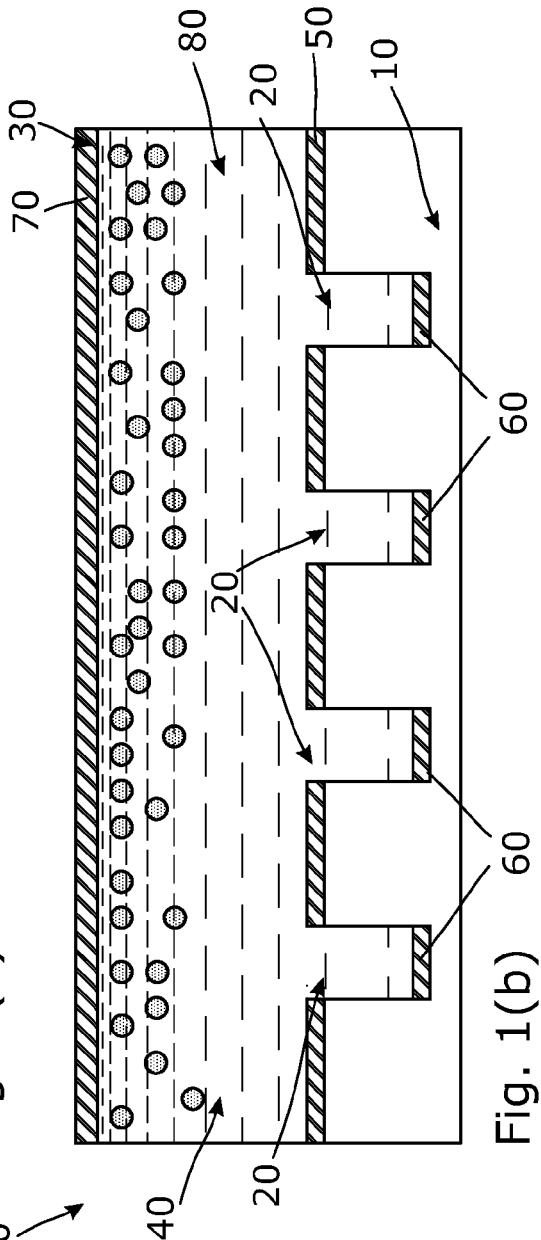

REFLECTIVE DISPLAY

The present disclosure relates to reflective displays, including full-color reflective displays.

A reflective display is a device formed of display elements, in which ambient light is modulated by the display elements and returned to the viewer. The display elements are controlled so as to modulate light returned to the viewer to display an image.

Since reflective displays use ambient light, a challenge is to provide a full-color display, which returns sufficient light to the viewer under different ambient lighting conditions.

BRIEF DESCRIPTION OF THE DRAWINGS

FIG. 1A is a schematic cross-sectional view of a single color display element in accordance with an example of the present disclosure, in a first state;

FIG. 1B is a schematic cross-sectional view of the display element of FIG. 1A, in a second state;

DETAILED DESCRIPTION

Figure 2:
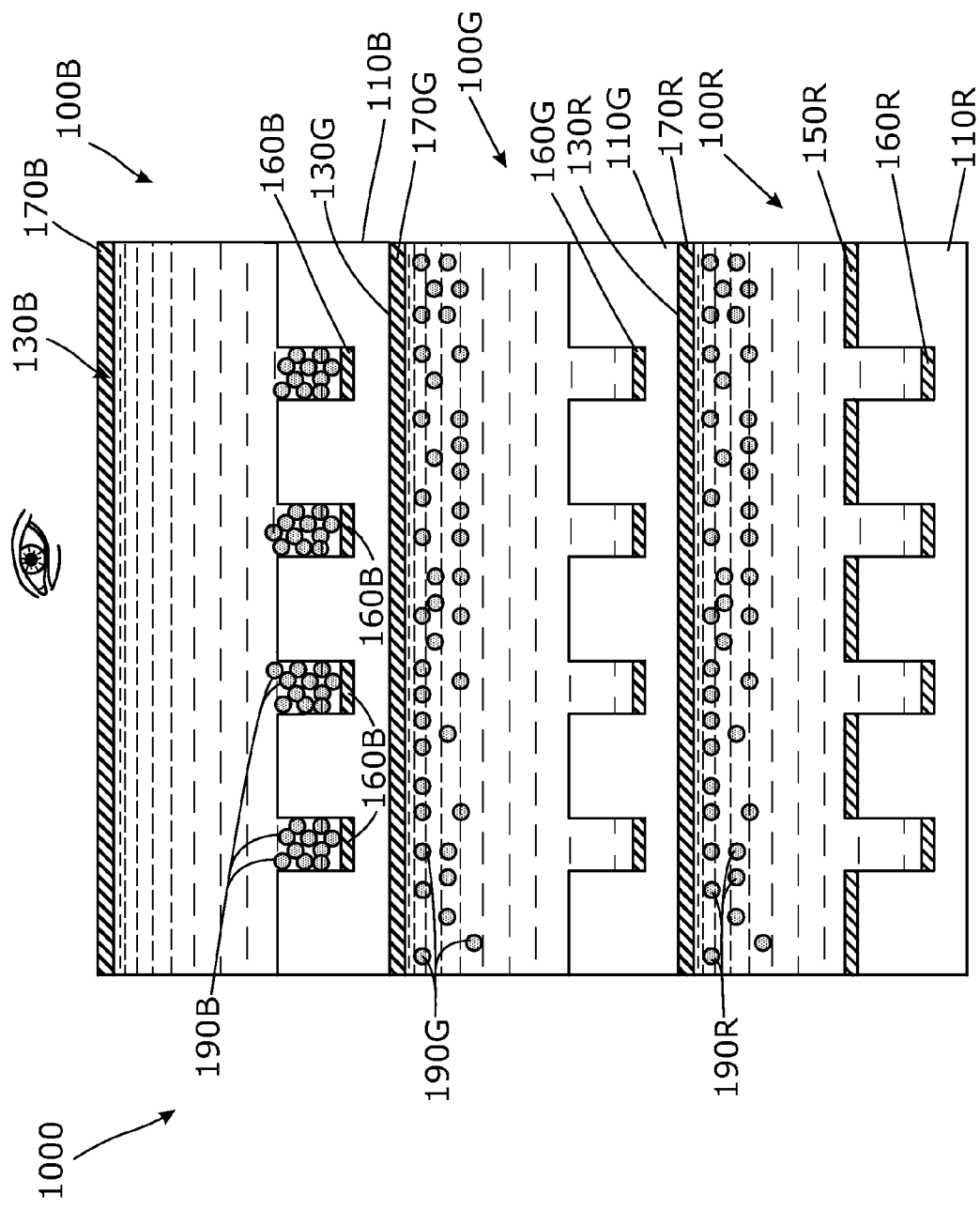
FIG. 2 is a schematic cross-sectional view of a color display element in accordance with an example of the present disclosure.

The present disclosure provides display elements, which may be used to form a monochromatic, polychromatic or full-color reflective display. As will become apparent from the following description, the use of such display elements provides an improved color gamut, including improvements in brightness, in color reflective displays.

The drawings are schematic and not to scale. Like reference numerals in different drawings are used to denote the same or similar features.

DEFINITIONS

In the following description, the term "transparent" means substantially 100% transmissive of wavelengths in and around the visible spectrum.

The term "light" means electromagnetic radiation having wavelengths in and around the visible spectrum.

References to "colored light" or "wavelengths/light of a (particular) color" mean light having wavelengths within a particular color waveband within the visible spectrum.

For example, the red waveband generally corresponds to wavelengths of 580 to 650 nm, the green waveband generally corresponds to wavelengths of 490 to 580 nm and the blue waveband generally corresponds to wavelengths of 400 to 490 nm. This may include light having wavelengths within more than one waveband, which combine to appear the particular color, such as yellow (combined green and red wavelengths), magenta (combined blue and red wavelengths), and cyan (combined green and blue wavelengths). An ideal absorber/reflector of light of a particular color absorbs/reflects light of wavelengths only within the particular color waveband.

The term "white light" means light having a spectral profile in the visible spectrum, that it is perceived as white by the human eye. Examples of white light include sunlight and light from some incandescent light sources.

The term "luminescent" means having the property of luminescence (including photoluminescence) i.e., able to absorb light of one wavelength/waveband and re-emit at least some of the absorbed energy in a different wavelength/waveband; the term "luminescent species" means atoms, molecules or groups thereof having the property of luminescence (including photoluminescence).

Terms such as "over" and "under", "above" and "below", "front" and "rear" etc., are used merely to indicate the relative position of features in the incident light path as illustrated to the drawings, and do not signify the orientation of such features in a display device.

DISPLAY ELEMENT EXAMPLES

An example display element according to the present disclosure comprises a luminescent material. In a first state of the display element, the luminescent material is able to modulate light incident on the display element and return luminescent light to a viewer. In a second state of the display element, the luminescent material can be substantially optically shielded within the display element so that substantially none of the light incident on the display element is modulated by the luminescent material and/or substantially no luminescent light is returned to a viewer.

Examples of a display element according to the present disclosure comprise a cell having a top and a bottom, the cell containing a substantially transparent fluid and a plurality of wells in the bottom of the cell. A luminescent material is within the cell for modulating light incident from the top of the cell and for returning luminescent light. A dispersion of particles, contained within the substantially transparent fluid, is movable between a first state/distribution in which the particles are substantially contained within the plurality of wells and a second state/distribution in which the particles are distributed between the top and bottom of the cell, to control the intensity of luminescent light returned by the display element.

FIGS. 1A and 1B are schematic cross-sectional views of an example of a single color display element 100 according to the present disclosure, in first and second states, respectively. In the first state, shown in FIG. 1A, the display element 100 is OFF or in a black state in which substantially no light is returned, and in the second state, shown in FIG. 1B, the display element 100 is ON or in a bright state that returns a desired color, as described below.

In the illustrated example, the display element 100 comprises a cell having a bottom, formed by a base substrate 10 in which a plurality of wells 20 are formed, and a top, formed by an upper substantially transparent substrate 30, separated from the base substrate 10 to define a cavity 40. The wells 20 are arranged, typically periodically, across an upper surface area of the base substrate 10, and consume a relatively small proportion of that surface area, typically less than about 10%. The upper surface of the base substrate 10, in the remaining area (i.e., outside the wells), comprises a light absorbing layer 50, such as a black layer. Electrodes 60 are provided at the base of each of the wells 20, and at least a portion of the upper substantially transparent substrate 30 may comprise an electrode 70. For example, electrode 70 may be formed as a transparent electrode over at least part of the lower (inner) surface of upper substantially transparent substrate 30, and typically is formed as a transparent blanket electrode over an area of substrate 30 corresponding to the area of the display element 100.

The visible area of the display element 100 comprises an area that can be seen by a viewer from the front of the display element 100.

A substantially transparent fluid 80 is contained within the cavity 40 together with a dispersion of luminescent particles 90. Luminescent particles 90 may be moved into or out of the wells 20 by means of electrophoretic or other electrokinetic forces (e.g., electrohydrodynamic effects), by applying appropriate signals, such as biasing voltages, to electrodes 60, 70, in order to control the intensity of luminescent light returned to the viewer.

For example, luminescent particles 90 may possess a charge so that they can be moved electrophoretically, for example, charged colloidal particles may be used as luminescent particles 90. In this case, the electrodes 60, 70 may be used to create electric fields that produce a force on the charged luminescent particles 90 that can be used to move them in or out of the wells 20.

Alternatively, the luminescent particles 90 may have an electric dipole moment, or may be polarizable, so that dielectrophoretic forces can be used to move the luminescent particles 90. In this case, the electrodes 60, 70 may be used to provide an electric field gradient to the particles.

Yet another possibility is to include charged species in the fluid (which may be the luminescent particles themselves, but could also be other charged species, e.g., ions, in the fluid) so that electrohydrodynamic forces can be used to move the luminescent particles 90. The electrodes 60, 70 may provide an electric field to move the charged species through the fluid, and the fluid will feel a drag force due to their motion. This, in turn, may cause motion of the fluid that can be used to help position the luminescent particles 90 as desired.

The luminescent particles 90 are selected to produce a desired color of the display element 100, for example red, blue or green. In particular, luminescent particles 90 absorb incident/ambient light in a range of wavelengths (e.g., one or more wavebands), and emit the absorbed energy at wavelengths that contribute to the desired color. The luminescent particles 90 may also scatter some wavelengths of light corresponding to the color of the display element.

The intensity of modulated light (i.e., of the desired color) produced by the luminescent particles 90 is at a maximum when substantially all the particles 90 are distributed throughout the cavity 40, and thus provide a maximum optical density in the visible area, i.e., the display element 100 is in a (fully) ON state, as shown in FIG. 1B, and is at a minimum when substantially all the particles 90 are contained within wells 20, i.e., the display element 100 is in a (fully) OFF state, as shown in FIG. 1A. Suitable luminescent particles include luminescent species such as colloidal semiconducting nanoparticles with or without dopants such as rare earth ions, or luminescent pigment particles containing luminescent dye molecules, oligomers or polymers. Multiple luminescent species may be used to provide a large absorption waveband and efficient emission at desired wavelengths. This can be accomplished through energy transfer processes between species such as non-radiative Förster exchange or radiative emission and reabsorption.

The use of luminescent particles 90 to modulate light and produce the desired color of the display element, in the ON state, provides improved color intensity and brightness compared with conventional, absorption-based light modulators, as discussed in further detail below.

The light absorbing layer 50 may comprise absorbing pigments or dyes that render it black, for example, carbon black particles.

In the first state (fully OFF state) shown in FIG. 1A, the luminescent particles 90 are contained within wells 20. Incident light, which enters through upper substantially transparent substrate 30 and passes through substantially transparent fluid 80, reaches the light absorbing layer 50 on the upper surface of base substrate 10, which typically absorbs incident light across all visible wavelengths. Since minimal incident light reaches luminescent particles 90 within wells 20 (which consume only a small fraction of the surface area, as discussed above), substantially no luminescent light is returned to the viewer. Thus, the display element 100 appears black.

In the second state (fully ON state) shown in FIG. 1B, the luminescent particles 90 are moved out of the wells 20 into the cavity 40 and are distributed between the top and bottom of the cell, above the light absorbing layer 50. Incident light enters through upper substantially transparent substrate 30 and reaches the luminescent particles 90, which, due to the optically dense distribution thereof, absorb a majority of the visible wavelengths (and potentially near ultraviolet wavelengths) of the incident light, within the absorption waveband of the luminescent particles 90, and emit light in a desired, typically narrow, emission waveband e.g., red, green or blue, which is returned back to the viewer. Thus, because the luminescent particles 90 form an optically dense layer in the cavity 40, substantially none of the incident light reaches, and is absorbed by, the light absorbing layer 50. The display element 100 therefore displays the desired, bright color.

A plurality of intermediate states exist between the above-mentioned first, fully OFF state and the above-mentioned second, fully ON state, corresponding to an associated plurality of intermediate particle distributions. In these intermediate states, the luminescent particles 90 are moved within the cavity 40 and wells 20 so as to be distributed at different optical densities within the cavity, i.e., different proportions of the dispersion of luminescent particles are distributed within the cavity, in order to control inter a/ia the amount of incident light that is utilized in the emission of luminescent light by the luminescent particles 50, and thus the intensity of luminescent light. Thus, the display element 200 is electrically controllable to provide a range of color intensities.

Groups of (typically) three different single color display elements 100 (e.g., red, green and blue or cyan, magenta and yellow, display elements) according to the implementation example of FIGS. 1A and 1B, may be arranged in a side-by-side configuration to form full-color display elements/pixels in an array of rows and columns to form a full-color display, as discussed further below.

In an example implementation of a side-by-side configuration, light scattering particles may be included in the substantially transparent fluid 80. Light scattering particles may be moved into and out of the wells 20 along with the luminescent particles 90. Suitable light scattering particles may selectively scatter only light of the luminescent wavelengths, so as to redirect downwardly directed luminescent light from the luminescent particles 90. In this way, luminescent light is directed back to be viewer, to improve light intensity.

In addition, three different single color display elements 100 according to the example implementation of FIGS. 1A and 1B, with appropriate modifications to enable the transmission of light through the upper two display elements, may be arranged in a stacked configuration to form a single full-color display element, and such display elements may be arranged in rows and columns to form a full-color display, as discussed further below.

FIG. 2 is a schematic cross-sectional view of an example of a color display element 1000 according to the present disclosure, based on a stacked configuration of the example of FIGS. 1A and 1B. The color display element 1000 comprises three different single color display elements 100B, 100G & 100R arranged in stacked configuration. At least the upper and middle display elements in the stack have substantially transparent base substrates 110B, 1104, 11 OR on substantially transparent substrates 130B, 130G & 130R, respectively. At least the upper and middle display elements in the stack have substantially transparent base substrates 110B, 110G & 110R without light absorbing layers, to allow transmission of light through the stack.

In particular, a top display element component 100B with a transparent base substrate 110B may include blue light emitting luminescent particles, a middle display element component 100G with a transparent base substrate 110G may include green light emitting luminescent particles, and a bottom display element component 100R may include red light emitting luminescent particles. A light absorbing layer 150 may be included on the upper surfaces, between the wells, of the base substrate 110R of the bottom display element component 100R. Electrodes 160B, 160G and 160R are included at the base of the wells of the top, middle and bottom display element components, respectively, which may be transparent (e.g., in the case of the top and middle display element components) or may be light absorbing (e.g., in the case of the bottom display element component).

Thus, typically the blue luminescent particles 190B in the top display element component 100B would be electrically moved from the wells into the cavity to absorb wavelengths shorter than blue to produce blue; the green luminescent particles 190G in the middle display element component 100G would be electrically moved from the wells into the cavity to absorb wavelengths shorter than green that are not absorbed by any blue luminescent particles 190B to produce green, and the red luminescent particles 190R in the bottom display element component 100R would be electrically moved from the wells into the cavity to collect wavelengths shorter than red that are not absorbed by blue and green luminescent particles 190B, 190G. With this stacking order, luminescent green and red light directed back to the viewer may not be absorbed by particles in the upper layers. However, luminescent blue or green light that is emitted downward may be reabsorbed by luminescent particles in lower display element components and utilized. In order to ensure a proper grey level (i.e., control of the proportion of distributed luminescent particles) in a given display element component for achieving an overall chroma and lightness for the stacked pixel, a lookup table dependent on the state of the other layers would typically be employed.

Figure 3A:
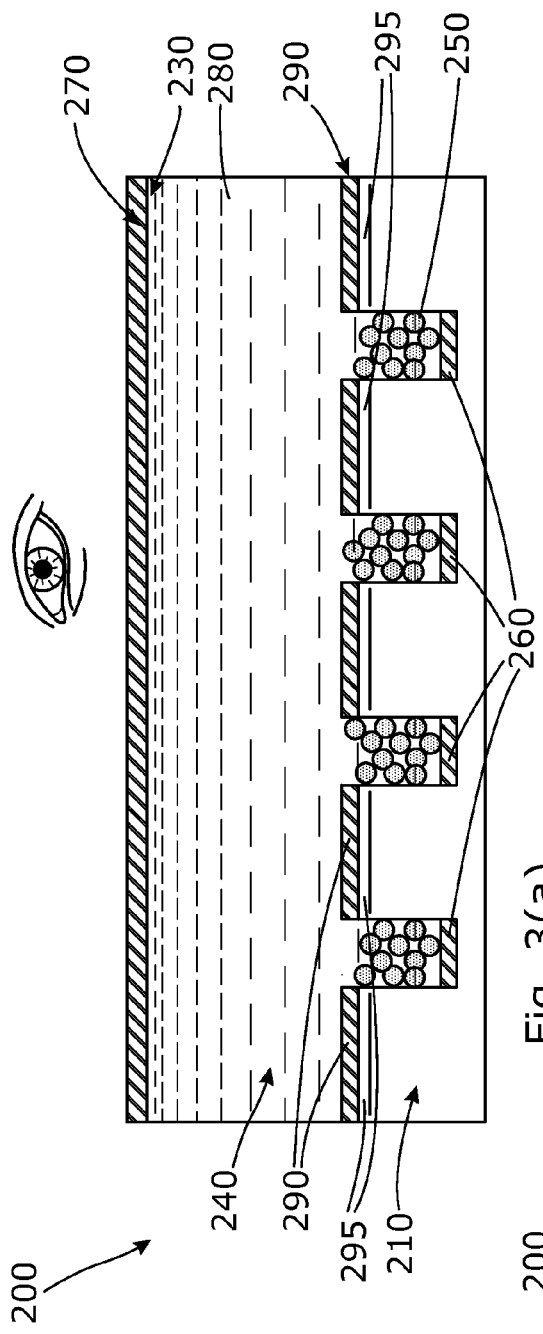
FIG. 3A is a schematic cross-sectional view of a single color display element in accordance with another example of the present disclosure, in a first state.
Figure 3B:
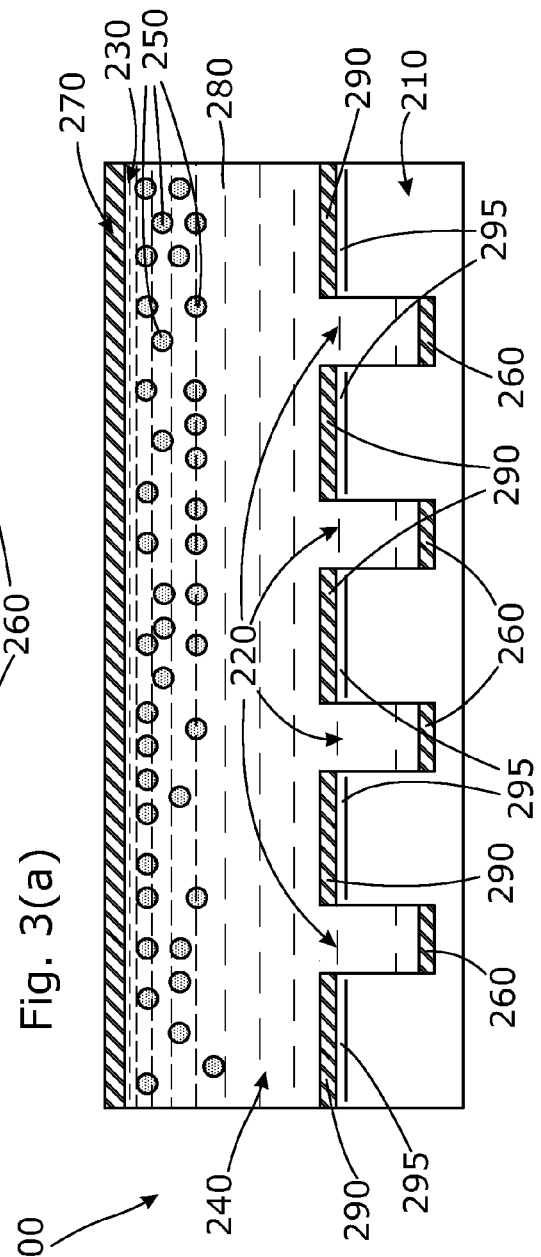
FIG. 3B is a schematic cross-sectional view of the display element of FIG. 2A in a second state.

FIGS. 3A and 3B are schematic cross-sectional views of another example of a single color display element 200 according to the present disclosure, in first and second states, respectively. In the first state, shown in FIG. 3A, the display element 200 is OFF or in a black state in which substantially no light is returned, and in the second state, shown in FIG. 3B, the display element 200 is ON or in a bright state that returns a desired color, as described below.

In the illustrated example, the display element 200 comprises a cell having a bottom, formed by a base substrate 210 in which a plurality of wells 220 are formed, and a top, formed by an upper substantially transparent substrate 230, separated from the base substrate 210 to define a cavity 240. The wells 220 are arranged, typically periodically, across an upper surface area of the base substrate 10, and consume a relatively small proportion of that surface area, typically less than about 10%. The upper surface of the base substrate 210 comprises a luminescent layer 290, as described below. Electrodes 260 are provided at the base of each of the wells 220, and at least a portion of the upper substantially transparent substrate 230 may be electrically conductive, to form an electrode 270. For example, electrode 270 may be formed as a transparent electrode over at least part of the lower (inner) surface of upper substantially transparent substrate 230, and typically is formed as a transparent blanket electrode over an area of substrate 230 corresponding to the area of the display element 200.

The visible area of the display element 200 comprises an area that can be seen by a viewer from the front of the display element.

A substantially transparent fluid 280 is contained within the cavity 240 together with a dispersion of light absorbing particles 250. Light absorbing (e.g., black) particles 250 may be moved into or out of the wells 220 by means of electrophoretic or other electrokinetic forces (e.g., electrohydrodynamic effects), by applying appropriate signals, such as biasing voltages, to electrodes 260, 270, in order to control the intensity of luminescent light returned to the viewer. Suitable techniques for enabling such movement of the light absorbing particles 250 into and out of the wells 220, including suitable particle characteristics, are described above in relation to the equivalent movement of luminescent particles 90 in the example of FIGS. 1A and 1B The luminescent layer 290 is a material selected to produce a desired color of the display element 200, for example red, blue or green. In particular, luminescent layer 290 absorbs incident/ambient light in a range of wavelengths (e.g., one or more wavebands) and emits the absorbed energy at wavelengths that contribute to the desired color. The material of the luminescent layer 290 may also scatter some wavelengths of light corresponding to the color of the display element. An optional reflector layer 295 (also termed "mirror", herein) may be included beneath the luminescent layer 290. Mirror 295 may be a broadband reflector or a reflector for selectively reflecting light. For example, mirror 295 may selectively reflect light of wavelengths corresponding to the emission waveband of the luminescent layer 290 and/or wavelengths that are not absorbed by the luminescent layer 290 but do contribute to the desired color of the display element 200 and/or wavelengths that are not fully absorbed by the luminescent layer 290 after a single pass through it, but are nearly fully absorbed after two passes through the luminescent layer 290. A wavelength-selective reflector may comprise a Bragg mirror, or a broadband mirror, such as a silver or aluminum film, overlayed with a color filter material that absorbs undesired wavelengths. Alternatively, a broadband mirror can be used in conjunction with absorbing species that are included in the luminescent layer 290 rather than in a separate absorbing layer above the mirror 295.

For example, to create a green display element a luminescent material can be used that absorbs wavelengths shorter than green and emits green light. In this case, the mirror 295 below the luminescent layer 290 should reflect at least the emitted green light as well as wavelengths not absorbed by the luminescent layer 290 that contribute to the desired green color state, such as somewhat longer green wavelengths. Ambient red light incident on this display element, that does not contribute to the desired green state, should not be returned to the viewer. This can be accomplished, in an example implementation, by using a mirror 295 that reflects the emitted green light, the ambient wavelengths not absorbed by the luminescent layer that contribute to the desired green state and, optionally, wavelengths that must pass through the luminescent layer twice to be adequately absorbed. Alternatively, a broadband mirror can be used in conjunction with species dispersed within the luminescent layer that absorb wavelengths that do not contribute to the desired green color state, e.g., red wavelengths. Similar considerations apply for providing mirrors 295 within display elements of other colors.

In example implementations, the light absorbing particles 250 may comprise absorbing pigments or dyes that render them black, for example, carbon black particles. In other example implementations, the light absorbing particles 250 may selectively absorb light e.g., light of wavelengths corresponding to the emission waveband of the luminescent layer 290, and the reflection waveband of the mirror below the luminescent layer 290, if included.

The intensity of modulated light (i.e., of the desired color) produced by the luminescent layer 290 is at a maximum when substantially all the light absorbing particles 250 are contained within wells 220, i.e., the display element 200 is in a (fully) ON state, as shown in FIG. 3A, and is at a minimum when substantially all the light absorbing particles 250 are distributed throughout the cavity 240, i.e., the display element 200 is in a (fully) OFF state, as shown in FIG. 3B.

Suitable luminescent materials include colloidal semiconducting nanoparticles with or without dopants such as rare earth ions, or luminescent pigments containing luminescent dye molecules, oligomers or polymers. Multiple luminescent species may be used to provide a large absorption waveband and efficient emission at desired wavelengths. This can be accomplished through energy transfer processes between species such as non-radiative Förster exchange or radiative emission and reabsorption.

The use of luminescent materials 290 to modulate light and produce the desired color of the display element, in the ON state, provides improved color intensity and brightness compared with conventional, absorber-based light modulators, as discussed in further detail below.

In the first state (fully OFF state) shown in FIG. 3A, the light absorbing particles 250 are moved out of the wells 220 into the cavity 240 and are distributed throughout the cavity 240 above the luminescent layer 290. Incident light, which enters through upper substantially transparent substrate 230, reaches the light absorbing particles 250 which may absorb incident light across all visible wavelengths. Thus, because the light absorbing particles 250 are distributed across the cavity 240, substantially none of the incident light reaches, and is absorbed, scattered or emitted by, the luminescent layer 290 or reflected by the mirror underneath it, if present. The display element 200 therefore appears black.

Alternatively, the light absorbing particles 250 may selectively absorb only those wavelengths emitted by the luminescent layer 290 and/or wavelengths not fully absorbed by the luminescent layer 290 that would otherwise be reflected by any mirror underneath it, thereby providing a dark state when distributed throughout the cavity 240.

In the second state (fully ON state) shown in FIG. 3B, the light absorbing particles 250 are contained within wells 220. Incident light, which enters through upper substantially transparent substrate 230 and passes through substantially transparent fluid 280, reaches the luminescent layer 290 on the upper surface of base substrate 210, which absorbs a majority of the visible wavelengths (and potentially near ultraviolet wavelengths) of the incident light, within the absorption waveband of the luminescent layer 290, and emits light in a desired, typically narrow, emission waveband e.g., red, green or blue, which is returned back to the viewer. Additionally, some wavelengths not absorbed by the luminescent layer 290, which contribute to the desired color state, are reflected back to the viewer by the mirror 295 below the luminescent layer, if present. Such a mirror 295 also may serve to reflect any downwardly emitted luminescent light back toward the viewer. Since minimal incident light reaches light absorbing particles 250 within wells 220 (which consume only a small fraction of the surface area, as discussed above), substantially no light is absorbed thereby. Thus, the display element 200 displays the desired, bright color.

A plurality of intermediate states exist between the above-mentioned first, fully OFF state and the above-mentioned second, fully ON state, corresponding to an associated plurality of intermediate particle distributions. In these intermediate states, light absorbing particles 250 are moved within the cavity 240 and wells 220 so as to be distributed at different optical densities within the cavity, i.e., a predetermined proportion of the light absorbing particles 250 are distributed within the cavity 240, in order to control the amount of incident light that can reach, and thus be utilized by, the luminescent layer 290 for the emission of luminescent light. Thus, the display element 200 is electrically controllable to provide a range of color intensities.

Groups of (typically) three different single color display elements (e.g., red, green and blue display elements) according to the implementation example of FIGS. 3A and 3B, may be arranged in a side-by-side configuration to form full-color display elements/pixels in an array of rows and columns to form a you know if much of full-color display, as discussed further below.

In addition, three different single color display elements 200 according to the example implementation of FIGS. 3A and 3B, with appropriate modifications to enable the transmission of light through the display elements, may be arranged in a stacked configuration to form a single full-color display element, and such display elements may be arranged in rows and columns to form a full-color display, as discussed further below.

Figure 4:
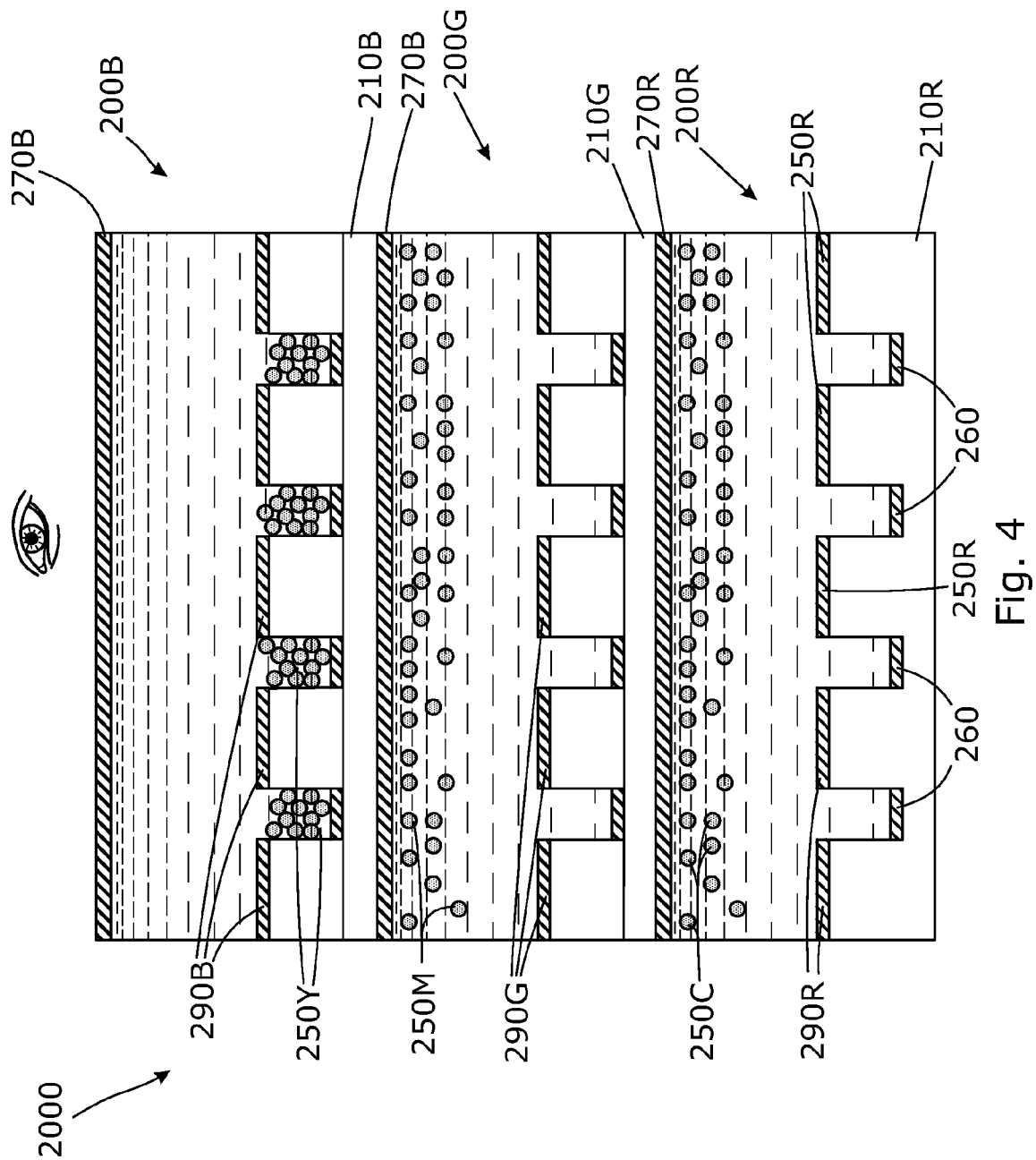
FIG. 4 is a schematic cross-sectional view of a color display element in accordance with another example of the present disclosure.

FIG. 4 is a schematic cross-sectional view of an example of a color display element 2000 according to the present disclosure, based on a stacked configuration of the example display elements of FIGS. 3A and 3B. The color display element 2000 comprises three different single color display elements 200B, 200G & 200R arranged in stacked configuration. At least the upper and middle display elements in the stack have substantially transparent base substrates 210, to allow transmission of light through the stack.

In particular, a top display element component 200B with a transparent base substrate 210B may include blue light absorbing particles 250Y (which appear yellow) and a blue light emitting luminescent layer 290B, a middle display element component 200G may include green light absorbing particles 250M (which appear magenta) and a green light emitting luminescent layer 290G, and a bottom display element component 200R may include red light absorbing particles 250O (which appear cyan) and a red light emitting luminescent layer 290R. In this stacked arrangement, luminescent layers with broader absorption bands may be employed without the luminescent emission of the luminescent layers 290 of the middle or lower display element components being absorbed by particles distributed in cavities 240 of the display element components above them, or by the luminescent layers 290 in the cavities above them.

In addition, each of the luminescent layers 290B, 290G & 290R may emit light in a relatively narrow waveband, and the light absorbing particles 250Y, 250M & 250C, respectively, absorb light in at least the same waveband, and typically also light of wavelengths reflected by any underlying, typically wavelength-selective reflector layers 295 (not shown). For example, the reflector layer in a given cell may reflect the luminescent wavelengths emitted by the luminescent layer in the same cell and/or wavelengths of ambient light that are not absorbed by the luminescent layer of that cell and that contribute to the desired color state.

Figure 5:
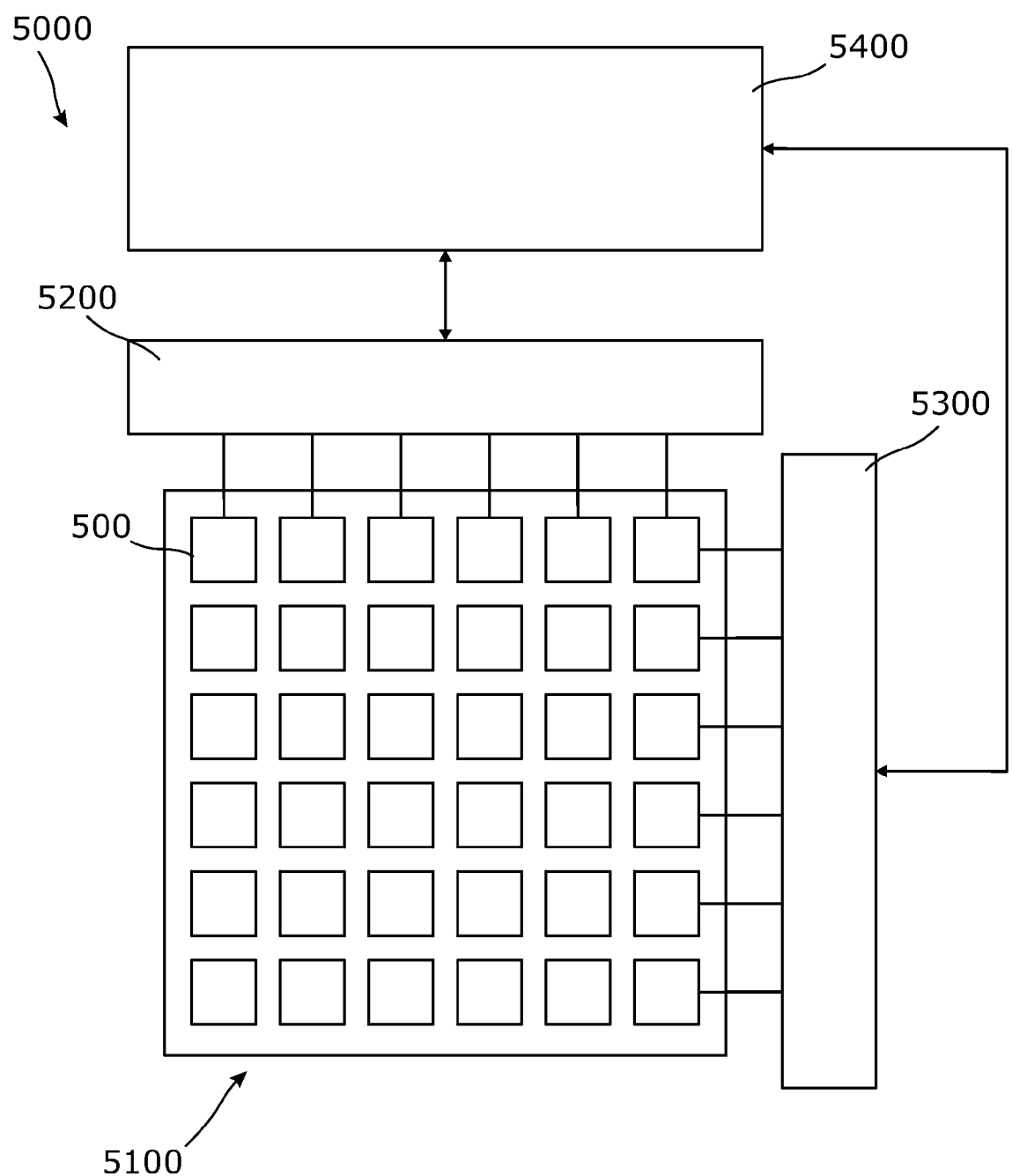
FIG. 5 is a schematic diagram of a display device implementing display elements in accordance with an example of the present disclosure.

FIG. 5 schematically illustrates a display device 5000 formed from an array of color display elements 500 according to examples of the present disclosure.

Display device 5000 comprises an array 5100 of rows and columns of display elements 500. As described above, in some example implementations, a full-color display element/pixel is formed by a group of three different single color display element components/sub-pixels (e.g., red, green and blue display element components) of FIGS. 1A & 1B or FIGS. 3A & 3B, arranged in side-by-side configuration. The relative areas of the different color display elements in a group forming a full-color display element/pixel may be selected to provide an appropriate color balance. In other example implementations, a full-color display element/pixel is formed by a group of three different single color display element components, arranged in a stacked configuration, as in FIG. 2 or FIG. 4.

Typically the display element/display element components in the array are fabricated with common substantially transparent substrates/electrodes and other features, as appropriate.

In a stacked display element architecture, each stacked display element component 500 forms a color pixel of full-color reflective display 5000. Each single color display element component 500A-C of each color display element 500 is independently controllable by a column driver 5200 and a row driver 5300. The column driver 5200 and a row driver 5300, under the control of a processor 5400, provide electrical/biasing signals to the electrodes (or equivalent) of each of the color display elements 500 to control the state thereof. Thus, the state of each color display element 500 is electrically controlled to modulate incident ambient light so as to produce the color for the corresponding pixel, as described above, so that the array displays a full color image.

Each color display element 500 is operated by applying signals to bias each of the single color display element components separately. In particular, predetermined bias signals may be applied between appropriate groups of electrodes of each of the single color display element components/subpixels, to control the intensity of light produced by each display element component, in order to achieve a desired color for the color display element/pixel (e.g., using a lookup table, as mentioned above).

By the inclusion of luminescent particles or luminescent layers in the display elements/display element components, a greater proportion of the spectrum of ambient incident light is used to produce the displayed color, in comparison to reflective display elements which merely reflect the part of the spectrum of ambient light corresponding to the displayed color. In particular, the use of luminescent materials allows wavelengths that would otherwise be absorbed to be converted to wavelengths that contribute to the desired color state. Thus, brighter reflective displays can be formed, which are capable of showing vibrant colors using only ambient illumination. In addition, the use of appropriate luminescent species with narrow emission spectra can provide more saturated colors, with larger color gamuts.

Figure 6:
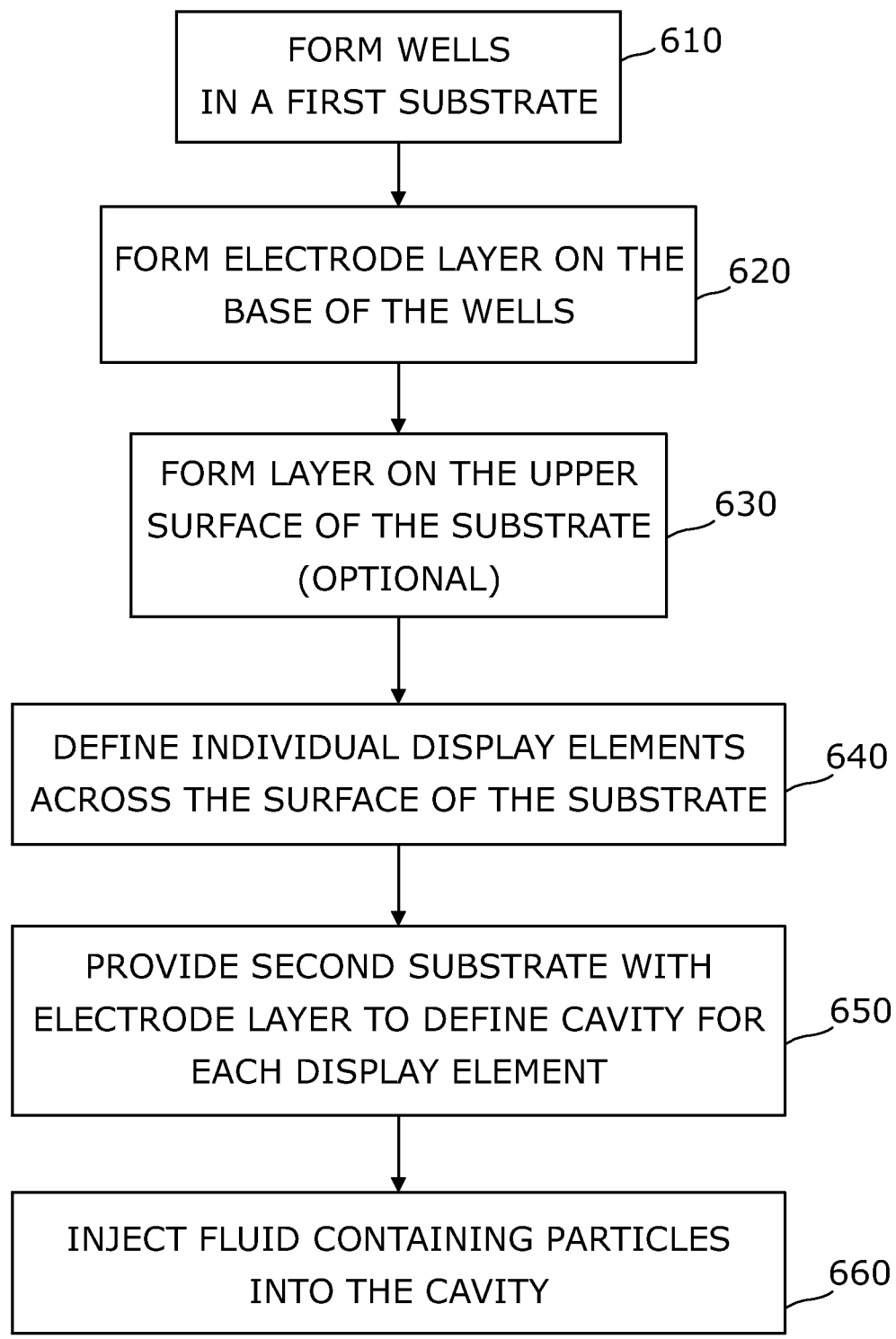
FIG. 6 is a block diagram of a method for forming display elements in accordance with an example of the present disclosure.

FIG. 6 is a block diagram of an example method for making an array of display elements according to examples of the present disclosure.

Wells are formed in a first substrate at block 610. In example implementations, the wells may be formed periodically across an upper major surface of the substrate and may consume less than 10% of the surface area thereof. The first substrate may be a substantially transparent material.

An electrode is formed on the base of the wells at block 620. For example, an electrically conductive layer may be deposited on the exposed surfaces of the substrate, and removed from the upper surface of the substrate between the wells, to leave a well electrode at the base of each of the wells. Groups of these well electrodes may be electrically connected to each other, e.g., in further processes, so that each of these groups can be individually addressed by driver electronics that provide desired bias voltages to them and which lie within different display element components, as discussed above.

In some examples, a layer is formed on the upper surface of the first substrate between the wells at optional block 630. Depending upon the particular example display element, the layer may be a luminescent layer, a light absorbing layer, a reflector layer, or a combination of these. For example, the layer may be formed by depositing a suitable luminescent, light absorbing or reflective material, and removing the deposited layer from the base of the wells, to expose the electrodes, by etching, lift off processes, or the like.

Individual display elements are defined across the surface of the first substrate at block 640. For example, upwardly extending dividing structures may be formed on the surface of the substrate to define areas in an array, each area including a plurality of wells with well electrodes, that will form individual display elements in the final structure.

A transparent second substrate with an electrode layer is provided, e.g., over the dividing structures, to define a cavity between the first and second substrates, for each individual display element at block 650. The electrode layer is typically formed from a substantially transparent material.

A fluid containing particles is injected into the cavities at block 660. For example, the fluid containing particles may comprise a substantially transparent fluid containing luminescent or light absorbing particles (depending upon the particular example display element), which may be charged particles, polarizable particles, or particles having an electric dipole moment, or the fluid may contain other charged species such as ions. Different fluids, containing different particles, may be used for individual display elements in the array, to produce different color display elements.

Further processes may be performed to complete the formation of an array of display elements.

In addition, similar processes to those described above in relation to FIG. 6 may be subsequently performed in order to form a color display element in a stacked configuration.

ALTERNATIVE EXAMPLES

A full-color display element may be formed from various different combinations of two, three or four different single color display element components. For example, in side-by-side architectures, combinations of two display element components (e.g., cyan and red producing components), three display element components (e.g., red, green and blue producing components or yellow, cyan and magenta producing components) or four display element components (e.g., red, green, blue and white producing components) may be employed to produce a pixel having the desired (partial or full) color gamut.

Display element implementations may be designed to use any suitable technique for moving the dispersion of particles into and out of the wells. The structure and configuration of the display elements, including the location of any electrodes, is determined based on design considerations, according to the application.

Whilst the display examples concern a reflective display, display element examples according to the present disclosure may be implemented in displays incorporating light sources, such as a front or side light, to provide illumination in the absence of adequate ambient light.

Various modifications and changes can be made to the described and illustrated examples, consistent with the present disclosure.

For example, whilst the described examples have a plurality of wells in a generally periodic arrangement, the wells may be arranged in any appropriate configuration, such that the wells consume an appropriate, small proportion of the visible area of the display element.

In examples implementing a light absorbing layer, such as the example of FIGS. 1A and 1B, the light absorbing layer may absorb light across all visible wavelengths (e.g., carbon black layer), or may absorb selected wavelengths, according to the desired application. For example, a display element may be designed to switch is between two colors rather than black and a color, such that the light absorbing layer should absorb only some wavelengths of light, so as to produce a desired, second color in the above-described "OFF state".

Accordingly, the examples should not be regarded as limiting the scope of the present disclosure or the accompanying claims.

The invention claimed is:

1. A display element comprising:
    a cell having a top and a bottom, the cell containing a substantilly transparent fluid;
    a plurality of wells in the bottom of the cell;
    a luminescent material within the cell for modulating light incident from the top of the cell and for returning luminescent light; and
    a dispersion of particles contained within the substantially transparent fluid;
    wherein the dispersion of particles is movable between a first state in which the particles are substantially contained within the plurality of wells and a second state in which the particles are distributed between the top and bottom of the cell, to control the intensity of luminescent light returned by the display element.

2. A display element as claimed in claim 1, further comprising at least one electrode, wherein the dispersion of particles is movable by means of signals applied to the at least one electrode.

3. A display element as claimed in claim 2, wherein the dispersion of particles is moved by means of electrophoretic or electrokinetic effects.

4. A display element as claimed in claim 1, wherein the wells consume an area of less than about 10% of the surface of the bottom of the cell.

5. A display element as claimed in claim 1, wherein the dispersion of particles is movable to any one of a plurality of intermediate distributions between the first and second states, wherein, for each intermediate distribution, a predetermined proportion of the dispersion of particles is distributed between the top and bottom of the cell providing a corresponding optical density therein.

6. A display element as claimed in claim 1, wherein the dispersion of particles contained within the substantially transparent fluid comprise luminescent particles, the luminescent particles forming the luminescent material, wherein, in the first state, the dispersion of particles return a minimum intensity of luminescent light and, in the second state, the dispersion of particles return a maximum intensity of luminescent light.

7. A display element as claimed in claim 6, further comprising a light absorber on at least a portion of the bottom of the cell, outside the plurality of wells, the light absorber for absorbing at least some wavelengths of incident light.

8. A display element as claimed in claim 1, wherein the dispersion of particles contained within the substantially transparent fluid comprises light absorbing particles, wherein, in the first state, the dispersion of particles absorbs a minimum amount of light so that a maximum intensity of luminescent light is returned by the luminescent material, and, in the second state, the dispersion of particles absorbs a maximum amount of light so that a minimum intensity of luminescent light is returned by the luminescent material.

9. A display element as claimed in claim 8, wherein the luminescent material comprises a layer of luminescent material over at least a portion of the bottom of the cell, outside the plurality of wells.

10. A display element as claimed in claim 9, further comprising:
    a reflector under the layer of luminescent material, the reflector comprising a broadband reflector or a reflector for selectively reflecting light of wavelengths corresponding to the luminescent light and/or wavelengths not absorbed by the luminescent material that contribute to a desired color state.

11. A display device comprising:
    an array of display elements as claimed in claim 1, and driver circuitry to control the display elements in order to display images.

12. A display comprising:
    an array of full color display elements, each full color display element comprising:
        a group of three display element components, each of the three display element components producing a different color, the group of three color display elements arranged side-by-side, each display element component comprising a display element as claimed in claim 1 comprising:
            a cell having a top and a bottom, the cell containing a substantially transparent fluid;
            a plurality of wells at the bottom of the cell;
            a luminescent material within the cell for modulating light incident from the top of the cell and for returning luminescent light in a particular waveband corresponding to the color of the display element component; and
            a dispersion of particles contained within the substantially transparent fluid;
            wherein the dispersion of particles is movable between a first state in which the particles are substantially contained within the plurality of wells and a second state in which the particles are distributed adjacent the top of the cell, to control the amount of incident light in the particular waveband returned as luminescent light by the display element.

13. A display as claimed in claim 12, wherein the three display elements produce:
    red, blue and green light, respectively;

yellow, cyan and magenta light, respectively, or
any combination of three colors which together produce light across substantially the entire visible spectrum.

14. A display element comprising:
a first substantially transparent substrate comprising a first electrode;
a second substrate separated from the first substantially transparent substrate to define a cavity therebetween, wherein the second substrate has a plurality of wells defined therein, and further comprises a second electrode at the bottom of at least one of the plurality of wells;
a substantially transparent fluid within the cavity;
a luminescent material for modulating light incident through the first substantially transparent substrate, the luminescent material for absorbing light in a first waveband and emitting luminescent light in a second waveband, and
a dispersion of particles in the substantially transparent fluid, the dispersion of particles electrically movable through the substantially transparent fluid, by means of signals applied to the first and second electrodes, between a first state in which the particles are substantially contained in the wells in the second substrate and a second state in which the particles are dispersed within the cavity;
wherein the intensity of luminescent light emitted by the luminescent material is controlled by moving the dispersion of particles between the first state and the second state such that desired proportions of the dispersion of particles are distributed throughout the cavity, thereby providing a desired optical density.

15. A display element as claimed in claim 14, further comprising:
a light absorbing material, for absorbing light in at least the first or second waveband.

16. A display element as claimed in claim 15, wherein the light absorbing material is for absorbing light of substantially all wavelengths in the visible spectrum.

17. A display element as claimed in claim 14, wherein:
the dispersion of particles constitutes at least part of the luminescent material, or the dispersion of particles comprises a dispersion of light absorbing particles.

18. A display element as claimed in claim 14, wherein:
the first color waveband is a broad absorption waveband, and/or
the second color waveband is a narrow emission waveband.

19. A display element comprising:
a first display element component at a front side of the display element, the first display element comprising:
a first cell having a top and a bottom, the first cell containing a substantially transparent fluid;
a plurality of wells at the bottom of the first cell;
a first luminescent material within the first cell for modulating light incident from the top of the first cell and for returning luminescent light in a first waveband; and
a dispersion of particles contained within the substantially transparent fluid;
wherein the dispersion of particles is movable between a first state in which the particles are substantially contained within the plurality of wells and a second state in which the particles are distributed between the top and bottom of the first cell, to control the intensity of luminescent tight in the first waveband returned by the display element;
a second display element component behind the first display element component, for receiving light transmitted by the first display element component, the second display element component comprising:
a second cell having a top and a bottom, the second cell containing a substantially transparent fluid;
a plurality of wells at the bottom of the second cell;
a second luminescent material within the second cell for modulating light incident from the top of the second cell and for returning luminescent light in a second waveband different from the first waveband; and
a dispersion of particles contained within the substantially transparent fluid;
wherein the dispersion of particles is movable between a first state in which the particles are substantially contained within the plurality of wells and a second state in which the particles are distributed between the top and bottom of the second cell, to control the intensity of luminescent light in the second waveband returned by the display element; and
a third display element component behind the second display element component for receiving light transmitted by the second display element component, the third display element component comprising:
a third cell having a top and a bottom, the third cell containing a substantially transparent fluid
a plurality of wells at the bottom of the third cell;
a third luminescent material within the third cell for modulating light incident from the top of the third cell and for returning luminescent light in a third waveband different from the first and second wavebands; and
a dispersion of particles contained within the substantially transparent fluid;
wherein the dispersion of particles is movable between a first state in which the particles are substantially contained within the plurality of wells and a second state in which the particles are distributed between the top and bottom of the third cell, to control the intensity of luminescent light in the third waveband returned by the display element.

20. A display element as claimed in claim 19, wherein:
the first color waveband is blue; the second color waveband is green, and the third color waveband is red.

* * * * *

UNITED STATES PATENT AND TRADEMARK OFFICE
CERTIFICATE OF CORRECTION

| | | |
|---|---|---|
| PATENT NO. | : 8,964,283 B2 | Page 1 of 1 |
| APPLICATION NO. | : 14/007612 | |
| DATED | : February 24, 2015 | |
| INVENTOR(S) | : Gary Gibson et al. | |

It is certified that error appears in the above-identified patent and that said Letters Patent is hereby corrected as shown below:

In the claims

In column 11, line 38, in Claim 1, delete "substantilly" and insert -- substantially --, therefor.

In column 14, line 8, in Claim 19, delete "tight" and insert -- light --, therefor.

In column 14, line 36 approx., in Claim 19, delete "fluid" and insert -- fluid; --, therefor.

Signed and Sealed this
Third Day of November, 2015

Michelle K. Lee
*Director of the United States Patent and Trademark Office*